July 2, 1968 D. M. HARRIS ETAL 3,391,270

ELECTRIC RESISTANCE HEATERS

Filed July 27, 1965 2 Sheets-Sheet 1

INVENTORS
DARREL M. HARRIS
HENRY H. BUCHTER
BY Robert J. Schaap
ATTORNEY

INVENTORS
DARREL M. HARRIS
HENRY H. BUCHTER
BY
Robert J. Schaap
ATTORNEY 3,391,270
ELECTRIC RESISTANCE HEATERS
Darrel M. Harris, Kirkwood, and Henry H. Buchter, St. Louis, Mo., assignors to Monsanto Company, St. Louis, Mo., a corporation of Delaware
Filed July 27, 1965, Ser. No. 475,106
10 Claims. (Cl. 219—385)

ABSTRACT OF THE DISCLOSURE

An apparatus for the production of semiconductor material where an epitaxial silicon layer is deposited on the surface of silicon wafers. The apparatus includes a furnace provided with a vertically disposed, flat, graphite, resistance heater element and a gas inlet and a gas outlet port. Silicon wafers are supported on each side of the heater element by notched pegs which pass through the heater element.

This invention relates in general to certain new and useful improvements in heating devices, and more particularly to an improved method and apparatus used in the formation of single crystal semiconductor bodies having a plurality of layers of different conductivities.

In recent years, semiconductor devices such as silicon controlled rectifiers have found widespread use in the electronics industry. These semiconductor devices are made from semiconductor materials which may have a plurality of layers of semiconductor material having different conductivities and separated by a transition zone. Semiconductor materials of this type having at least two layers of different conductivities with a transition region therebetween are very suitable for use in the formation of electronic members such as diodes, transistors, switches and similar types of electronic structures. One very effective method of producing semiconductor material is by the epitaxial deposition of silicon on a wafer formed of like material. Generally, the wafers involved must be formed of single crystal silicon with precisely controlled concentrations of doping impurities. These silicon wafers are then normally placed on a graphite heating element which is secured to the electrical contacts of an epitaxial silicon furnace, and are heated to a temperature where a monocrystalline silicon layer is grown on the wafer surface. One effective method of producing this silicon epitaxial layer on the silicon substrate is by the reduction of gaseous trichlorosilane. These wafers are then further processed by conventional methods and used in the manufacture of the above solid-state devices.

In recent years, it has become a common practice to employ resistance heating elements formed of graphite in these epitaxial silicon furnaces. The heating elements are generally U-shaped in horizontal cross section and consist of a pair of legs which are connected by a bight portion. The legs are generally provided with terminal connectors at their free end, or that is the ends remote from the bight portion for ultimate connection to the electrical contacts of the deposition furnace. A suitable amount of electrical current is then passed through the heating element to heat the element to the desired reaction temperature.

It has been a common practice in the prior art to dispose these heating elements or so-called "bridges" in a substantially horizontal position so that the silicon wafers may be placed directly upon the upper surface of the heating element. However, a horizontally disposed bridge has proved to be rather ineffective, particularly where it is desired to produce a large number of epitaxial silicon wafers in a single operation. It appeared as though the gas flow patterns resulted in deposition of the greater portion of the silicon on the wafers near the free end of the heating element. The gas jets of the silicon bearing material and the reduction material, which was generally hydrogen, entered beneath the bridge so that the gas would flow beneath the bridge around the free ends and over the upper portion thereof. During the reaction, the free silicon thus formed would then become deposited on the upper surface of the silicon wafer. However, much of the silicon contained within the feed gases was consumed and the wafers near the contact ends of the heating element received substantially lesser quantities of silicon layers. Moreover, it was difficult to maintain uniformity of thickness in the epitaxial layers in this type of operation.

Aside from the above problems, the heating elements were generally small in their construction by reason of the fact that they were almost always mounted in cantilever positions. Because of the fact that they were constructed of electrical resistance material, they were not inherently strong and consequently, the legs could not accommodate a large number of silicon wafers. Therefore, the wafers had to be very carefully placed on the legs of the heating element so that a maximum amount of bridge area was employed in each epitaxial deposition operation. Accordingly, a great deal of labor time was consumed in this operation, which materially increased the cost of each of the silicon wafers.

In United States Letters Patent No. 3,131,098, there was an attempt to support a heating element in a position where it was angularly disposed with respect to the horizontal. The heating element was formed with a plurality of recesses or sockets to accommodate the various wafers and was positioned at an angle of at least 15 to 25° with respect to the vertical. The wafers were held in the recesses due to the fact that the sockets were angularly disposed and were prevented from falling out of the sockets during the epitaxial operation. However when current was passed through heating elements which were formed of an electrically resistant material, a great deal of vibration occurred and the wafers were subjected to these extreme vibrations which often caused them to fall out of the sockets if the heating element was not positioned at a sufficiently large angle with respect to the vertical. Moreover, because of the positioning of the wafers within sockets, gas flow was interrupted and accordingly, a greater amount of the epitaxial material was deposited along one margin of the wafer providing a relatively uneven distribution of epitaxial material. Accordingly, this type of bridge arrangement was not sufficient for use in the production of high quality wafers in the epitaxial deposition technique.

It is, therefore, the primary object of the present invention to provide an apparatus which is capable of producing epitaxial deposition layers on semiconductor material to produce a semiconductor body having at least two layers with a transition region therebetween.

It is another object of the present invention to provide an apparatus of the type stated which is capable of producing epitaxial deposition layers on a plurality of wafers where each of the layers has a substantially uniform thickness.

It is a further object of the present invention to provide an electric resistance heating element for use with the above stated apparatus which is highly efficient and relatively inexpensive to manufacture.

It is an additional object of the present invention to provide an electric resistance heating element of the type stated which can be conviently and inexpensively modified for accommodation to the conditions of the particular epitaxial deposition furnaces.

It is also an object of the present invention to provide a method for the production of a plurality of uniform semiconductor bodies by the deposition of an epitaxial layer thereon to produce a semiconductor body with a plurality of layers with a transition region therebetween.

It is another salient object of the present invention to provide a method of the type stated which is relatively inexpensive to perform and requires relatively small amounts of manual labor time.

With the above and other objects in view, our invention resides in the novel features of form, construction, arrangement, and combination of parts presently described and pointed out.

In the accompanying drawings (2 sheets):

Figure 1:
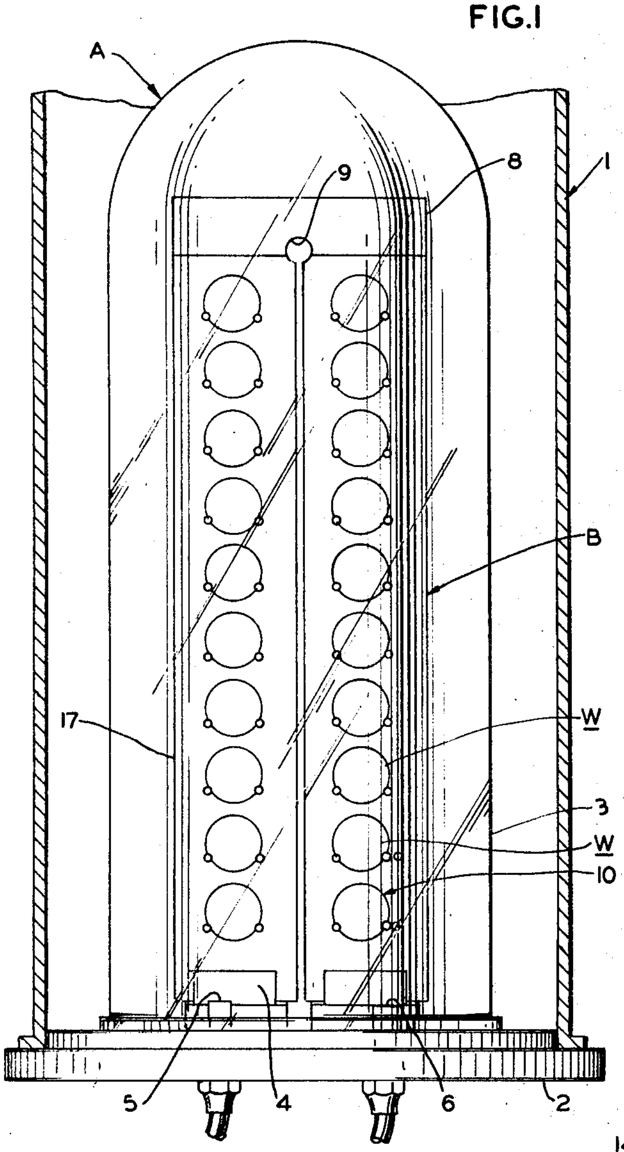
FIGURE 1 is a front elevational view of an apparatus for producing semiconductor bodies by the deposition of an epitaxial layer on semiconductor material and which apparatus is constructed in accordance with and embodies the present invention.
Figure 2:
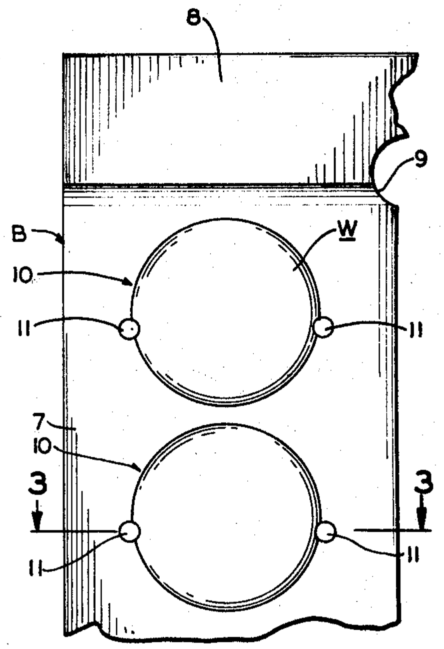
FIGURE 2 is an enlarged view partially broken away showing the mounting of wafers on one leg of the resistance heating element of FIGURE 1.

Generally speaking, the present invention relates to an apparatus and method for producing a plurality of semiconductor bodies having a plurality of layers of semiconductor materials with different conductivities and where each of the layers is separated by a transition region. The various layers are of a single crystal structure, and have different conductivities, either in type or in degree. The present invention provides an apparatus which generally comprises a bell jar removably secured to a base element. The bell jar generally forms a part of a conventional epitaxial deposition furnace which includes a clamping element having an extended electrode to which is secured the heating element of the present invention. The heating element or so-called "bridge" is substantially vertically disposed in the bell jar in the manner as shown in FIGURES 1 and 2. The heating element is designed so that it is provided with sufficient area to accommodate at least one row of wafers on each of the legs. Each of the rows is provided with a plurality of wafer positions where each wafer is secured for the epitaxial deposition operation. In the embodiment of the invention where each leg is designed to accommodate a single row of wafers, each wafer position is provided with a pair of pins which engage the wafer slightly below a line which would pass through the horizontal diameter of the wafer. Each of the pins is kerfed or is provided with recesses which are sized to accommodate the thickness of each of the wafers.

In the embodiment of the invention where at least two rows of wafers are deposited on each of the legs, each of the wafer positions is provided with an outer pin which engages the outer margin of the wafer slightly below the horizontal diameter of the wafer. A central pin is positioned between each of the wafers and is kerfed on each side to engage the annular margin of each of the wafers at a point approximately in horizontal alignment with the horizontal diameter of each of the wafers. In this manner, a plurality of wafers may be mounted on each of the legs, and of course, wafers can be mounted on each side of the legs, thereby substantially increasing the capacity of each heating element. Moreover, the wafers can be easily deposited in the respective wafer positions merely by dropping them so that they are engageable by the pins. In this manner, the wafers are easy to position on the heating element, and are easily removable therefrom.

The foregoing process may be employed in the formation of semiconductor bodies of known semiconductor material, the only criterion being that a decomposable vapor source of the material is available. The terms "thermally decomposable," "thermal decomposition," and "the associated deposit of a product of decomposition" as used herein are intended to be generic to the mechanisms of the decomposition of various silicon containing gases such as silane, trichlorosilane, silicon tetrachloride, etc. and the liberation of silicon atoms through the action of heat on such gases. These terms are also generic to and are included within the concept of the mechanisms of high temperature reactions where high temperature causes interaction between various materials with the liberation of specific materials or atoms.

Referring now in more detail and by reference characters to the drawings which illustrate practical embodiments of the present invention, A designates an apparatus for producing semiconductor bodies of substantial area and planarity having a plurality of layers of different conductivities with transition regions therebetween. The apparatus A generally comprises an epitaxial deposition furnace 1 which includes a base member 2 and removably secured thereto is a conventional bell jar 3, which is preferably formed of a transparent quartz material or similar material normally employed in the manufacture of bell jars. The apparatus A also includes a base electrode or clamping electrode 4 which is designed to removably accommodate a graphite heating element or bridge B, substantially as shown in FIGURES 1 and 2. The apparatus A is also provided with a gas inlet jet 5 and a gas exhaust port 6, thereby permitting entry and removal of reaction gases to the internal or reaction chamber *c* in the bell jar. The electrode 4 is suitably connected to a source of electrical current (not shown) in order to provide sufficient amount of energy for heating of the bridge B.

The bridge B is of the type described in my copending application Ser. No. 415,363, filed Dec. 2, 1964, and has a pair of vertically disposed legs 7 which are connected by a horizontally disposed bight portion 8. The bridge B is of the double-taper type where the legs are tapered from each of its transverse ends in such manner that they have a slightly smaller cross sectional thickness at each of the ends than in the center portion thereof, when referring to the transverse dimension of the legs. Thus, it can be seen that the thickness of each of the legs increases as the distance from the free ends thereof increases. The angle of taper of each of the legs is so adjusted that a cross sectional area of each of the legs 7 is maintained in order to provide a substantially constant uniform temperature distribution across each of the legs. The bight portion 8 is slightly thicker in the transverse dimension, reference being made to FIGURE 2, than the overall thickness of the legs. For heaters having legs with an overall length of approximately 22", the legs have an overall thickness of approximately 0.260" at the center portion and a thickness of approximately 0.215" at each of the ends. The bight portion 8 generally has an overall thickness of approximately 0.500" and a relative height of approximately 1⅝". The graphite heating element B is provided with a circular recess 9 at the point of connection of each of the two legs 7 with the bight portion 8. The circular recess 9 has a diameter of approximately ½" and serves to create a substantially uniform temperature region across the width of the bight portion 8. In essence, the recess 9 forms a heat sink for heat dissipation in the region of high current density. In this manner, it can be seen that relatively even resistance characteristics are maintained throughout each of the legs 7 and the bight portion 8 and therefore, it is possible to maintain a substantially uniform temperature distribution across the lengths of each of the legs. It has been found that this substantially increases the uniformity of epitaxial films deposited on the layers.

It is also possible to maintain uniform temperature characteristics throughout the lengths of each of the heater legs 7 by selectively altering the cross sectional area in the manner also shown in my copending application Ser. No. 415,363, filed Dec. 2, 1964. In this method, it is necessary to measure the temperature produced at various selected portions along the length and width of the heater legs. This can be conveniently accomplished by attaching thermocouples to the heater and connecting the leads thereof to a suitable temperature readout device. An optical pyrometer may also be employed. After the temperature along the selected portions of the length of the heater legs has been recorded, the desired cross sectional area can be obtained by removing the required amount of this cross sectional area. This is conveniently accomplished by drilling small apertures which are sufficiently small so that they do not interfere with the internal strength of the heater, but yet are sufficient in number so that they sufficiently alter the cross sectional area of the legs to provide proper resistance characteristics.

The material of construction of the bridges B is not necessarily limited to graphite, inasmuch as the bridges B can be prepared from any electrically conductive material which exhibits a characteristic of becoming heated due to the passage of electrical current theretherough. The bridges may be of material such as silicon, or conducting ceramics such as silicon carbide, or graphite or refractory metals such as tantalum, molybdenum, or titanium. One important criterion is that the bridge must be made of a material which does not interact with the system by introduction of undesirable impurity atoms.

The bridge may also be surface treated in the manner described in my copending application S.N. 423,066, filed Jan. 4, 1965. In this procedure, free silicon, which is produced by the reduction of gaseous trichlorosilane, is fused to the surface of the graphite heating element and reacts with the carbon atoms of the heating element to form a tightly adherent, substantially permanent, gas impervious film. The graphite heating element is heated to a temperature where a portion of the silicon reacts with the carbon of the heating element to form a silicon carbide film and the remainder of the silicon, which becomes liquified, penetrates into the pores of the graphite and becomes fused to the graphite. It has also been found possible to deposit a silicon carbide coating on the surface of the bridge which is prepared by the simultaneous reduction of trichlorosilane and chloroform. Here again, the silicon carbide becomes bonded to the surface of the graphite heating element. As a preferred embodiment, it has been found to be very acceptable to produce alternating layers of silicon and deposit these layers on the surface of the heating element. Similarly, it has been proved that alternating layers of silicon and silicon carbide form an excellent coating for heating elements, all in the manner as more fully described in said copending application Ser. No. 423,066, filed Jan. 4, 1965.

The wafers *w* of semiconductor material are prepared in any suitable manner, as for example, slicing or cutting wafers from commercially available zone refined single crystals of semiconductor material. Both of these methods are well known in the prior art. It is important that the wafers are cut in such a manner that the surface of the wafer to be treated is oriented in a specific crystallographic plane. Generally for the purposes of the present invention, it is preferred that the wafers are cut or sliced in such a manner so that they are oriented in a (1–1–1) plane on the Miller indices. Naturally, the surface of the wafer, which is to receive the epitaxial deposition film is carefully prepared by the generally accepted techniques of lapping, polishing, etching, and cleaning before the epitaxial deposition operation.

Figure 3:
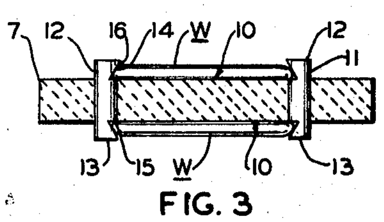
FIGURE 3 is an enlarged fragmentary sectional view taken along line 3—3 of FIGURE 2.
Figure 6:
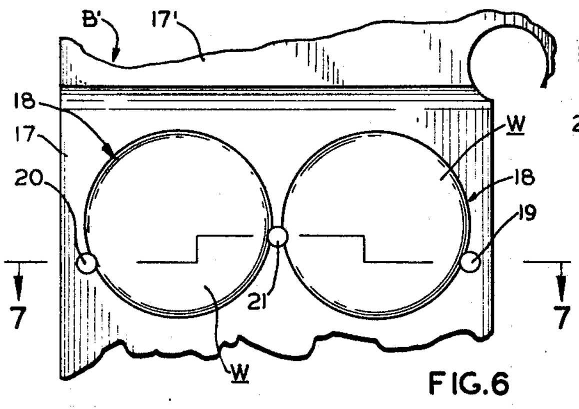
FIGURE 6 is an enlarged view, partially broken away, showing the mounting of wafers on one leg of the resistance heating element of FIGURE 4.

Each of the legs 7 is provided with a plurality of longitudinally spaced wafer positions 10 which are located so that a wafer *w* in one wafer position 10 is spaced a slight distance from another wafer *w* located in the next adjacent wafer position 10. In this manner, the maximum amount of surface area of each leg of the bridge B is employed. Each side of the legs 7 is provided with marginally registered wafer positions. Each of the wafers *w* is engaged slightly below its horizontal diametral diameter by a pair of retaining pins 11 which extend transversely through the legs so that they form projected ends 12, 13 on each side of the legs 7. The retaining pins are located along the periphery of the wafer position at an angle of about 20° to 30° below the horizontal centerline of the wafer position. In this manner, one pair of pins 11 is capable of engaging wafers *w* which are horizontally aligned on opposite sides of each of the legs 7. Thus, it is possible to employ both surfaces of the heating element to use the maximum surface area available on each of the bridges B. The pins 11 have a diameter within the range of 0.030" to 0.250" and a preferred diameter of 0.050". The terminal ends of the pins 11 extend beyond the surface of the bridge for a distance between 0.015" to 0.030" depending upon the relative thickness of the particular wafers to be used on this bridge. Each of the extended ends 12, 13 is provided with notches 14 which are defined by a base wall 15, which is coplanar with the surface of the legs 7. The extended ends 12, 13 are further provided with inwardly tapering side walls 16 which are sized to engage the peripheral margin of each of the wafers *w* in the manner as shown in FIGURE 3. Thus, it can be seen that since the pins 11 are located beneath the horizontal diameter of each of the wafers *w*, they will engage the wafers *w* so that they can be retained when the bridge B is disposed in a substantially vertical position. Each of the notches 14 is so designed so that the side walls 16 thereof engage the peripheral margin of the wafer and the base wall 15 is coplanar with the surface of the bridge, all as can best be seen in FIGURE 2.

It has been found that by means of the above outlined construction, the wafers can be easily mounted in their respective wafer positions 10 merely by dropping the wafers so that they are engaged by the extended ends 12, 13. After each of the wafers *w* has been placed in the wafer positions 10, the bridge can be lightly tapped so that the wafers will more fully settle in the notches 14. In fact, it has been found that through this construction the bridge can be tilted slightly or even to a horizontal position without permitting the wafers *w* to fall. Moreover, it has been found that since the wafers *w* are not disposed within recesses or sockets, no portion of the surface of the wafer is shielded from the gas flow and consequently, a substantially uniform epitaxial deposition coating is deposited on the upper surface of the wafer *w*.

It is possible to provide a modified form of heating element or so-called "bridge" B' which is constructed in accordance with and embodying the present invention, substantially as shown in FIGURES 4–7. The heating element B' is substantially similar to the heating element B, and comprises legs 17 connected by a bight portion 17' except that the legs 17 are sufficiently wide so that each leg is capable of accommodating two rows of wafers *w*. In this construction, it can be seen that each of the legs 17 is provided with two rows of vertically extending wafer positions 18. The bridge B' may have its cross sectional thickness altered in order to vary the cross sectional thickness to obtain the desired resistance characteristics and hence uniform temperature across the length of the legs. Moreover, the bridge B may be surface coated in the manner as described in connection with the surface coating of the bridge B.

Figure 7:
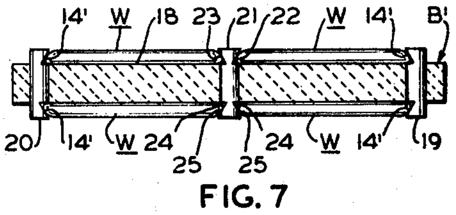
FIGURE 7 is an enlarged fragmentary sectional view taken along line 7—7 of FIGURE 6.
Figure 5:
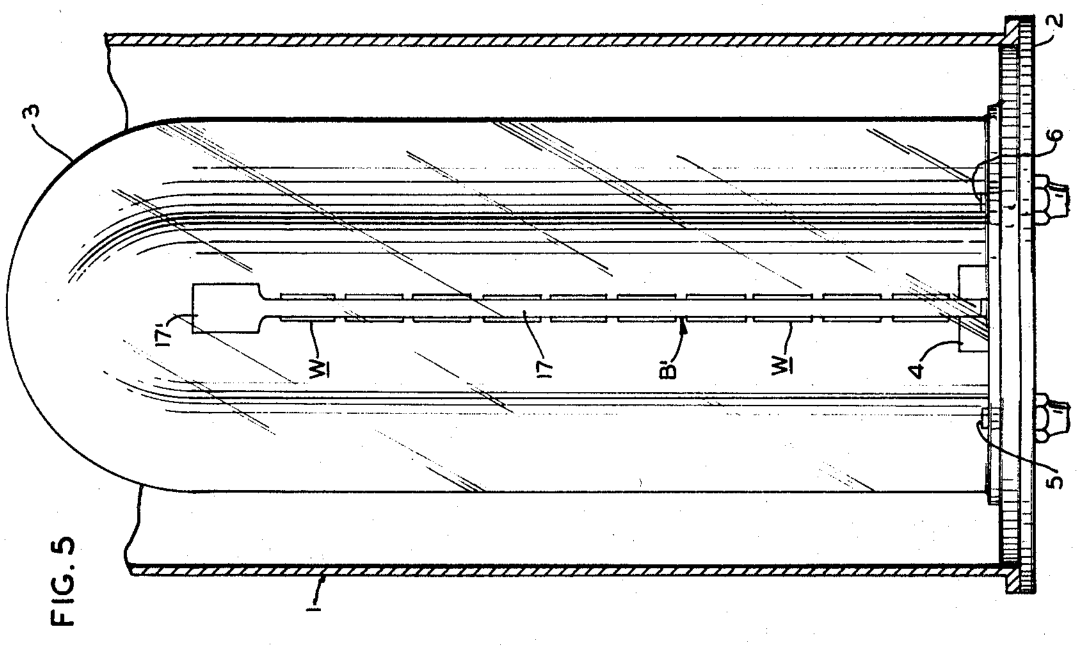
FIGURE 5 is a side elevational view, partially broken away, of the apparatus of FIGURE 4.
Figure 4:
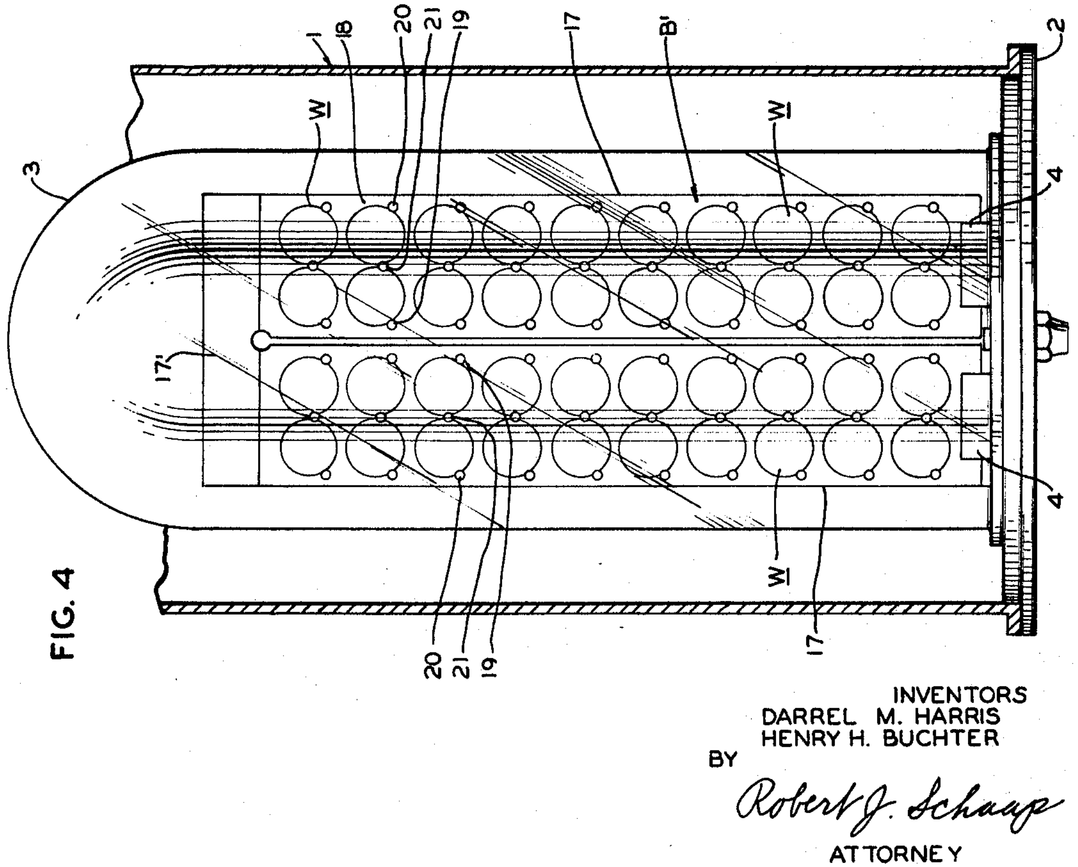
FIGURE 4 is a front elevational view, partially broken away, of a modified form of apparatus for producing semiconductor bodies by the deposition of an epitaxial layer on semiconductor material and which apparatus is constructed in accordance with and embodies the present invention.

In this embodiment, the inner wafer positions 18 have an inner wafer pin 19 mounted slightly beneath the horizontal diameter of the wafer position and the outer wafer positions have a pin 20 located slightly below the horizontal diameter of the wafer position. The pins 19, 20 are substantially identical to the previously described pins 11 and moreover, the pins 19, 20 are located along the periphery of the wafer positions at an angle of about 20° to 30° below the horizontal centerline of the wafer position. The outer and inner wafer positions 18 share a common pin 21, which is located at the horizontal diameter of each of the wafer positions, substantially as shown in FIGURE 4. The pin 21 is so located that the upper peripheral margin thereof is tangential to the horizontal centerline passing through the wafer position. Each of the pins 19, 20 is also provided with notches 14′ which are identical to the notches formed within the pins 11. Moreover, the pins 19, 20 have extended ends which extend on both sides of the bridge surfaces so that each leg of the bridge is capable of accommodating two rows of marginally aligned wafers on the oppositely presented surfaces thereof. The center pin 21 is provided with a pair of opposed notches 22, 23 on each of the transverse sides of the extended ends which are located on opposite surfaces of the bridge. Thus, each of the notches 22, 23 is provided with base walls 24 which are coplanar with the surfaces of the legs 17, and side walls 25 which are angularly disposed with respect to the base wall 24 and taper inwardly so that a notch having an acute angle is formed in the manner as shown in FIGURE 7.

It is desirable to locate each of the pins 19, 20 and 21 and the pins 11 in the bridge B as close to the horizontal diameter of each of the wafer positions as possible. However, in the bridge B, the pins 11 had to be disposed slightly beneath the horizontal diameter to support the wafer. In the case of the bridge B′, the center pin 21, which is common to both wafer positions can be placed approximately at the horizontal diameter of the wafer positions inasmuch as each wafer position has one pin 19 and 20 located slightly below the horizontal diameter thereof. It is desirable to locate each of the respective pins at the horizontal diameter in order to eliminate any possibility of interference with gas flow. However, inasmuch as the extended ends of the pins are relatively short with regard to the overall thickness of the wafer *w*, the interference with the gas flow is very small. Moreover, these portions of the wafers immediately adjacent to the pins are generally removed in further processing operations where the wafer is employed to construct a semiconductor device.

It should be appreciated that by following the teachings of this invention, it is possible to form semiconductor bodies having a plurality of layers of differing conductivities. Moreover, the thickness of each of the layers may be precisely controlled by generally accepted techniques. This allows the transition region or junction to be accurately positioned in the semiconductor body. Moreover, it is also possible to provide in any layer formed, any variation in conductivity desired in a plane which is parallel to the transition region by varying the concentration of the active impurity atoms in the reacting gases.

It can also be seen that any desired type of semiconductor materials may be made by utilizing the methods and the apparatus of the present invention. Various semiconductor devices are then made in a conventional manner from the semiconductor materials produced by the methods and apparatus described herein. In each case, the semiconductor device will have at least two layers of semiconductor material with different conductivities and each of the layers being separated by a transition region. In some instances, the transition region will be a P-N junction, where in other cases, it may be a P-I or an N-I junction. In many cases as desired, there may be a sharp transition region between layers of high and low resistivity material of the same conductivity type. It should also be appreciated that the invention may be employed in the formation of semiconductor bodies having a plurality of layers of semiconductor material of differing conductivities separated by a transition region. It should be understood that each of the layers may be the same semiconductor material and other than silicon, for example, silicon carbide, various group 3–5 compounds, such as gallium arsenide, indium antimonide, gallium phosphide, and similar types of material. Naturally, the individual layers of these latter groups of compounds may be formed of different semiconductor materials. It is, however, important that essentially single crystal growth is maintained and hence, strong consideration must be given when depositing layers of dissimilar material to the crystallography of the surface on which the growth occurs in order to preserve the single crystal characteristics to the greatest degree possible.

*Examples*

The invention is further illustrated by but not limited to the following examples which illustrate the uniformity of surface coating obtained by the apparatus and method of the present invention.

*Example 1*

The following example illustrates the effect of the wafer position on the bridge which has been coated by the procedure of the present invention, as a function of the epitaxial layer thickness and the wedging ratio. In each of the following examples, the wedging ratio is defined to mean the ratio of the greatest thickness at any point on the epitaxial layer to the minimum thickness of the epitaxial layer at any point on the wafer. The graphite heater employed in this example had an overall length of 24″, and an overall width of approximately 3$\frac{9}{16}$″. Each leg had a width of approximately 1$\frac{23}{32}$″ separated by a slot of $\frac{1}{8}$″ between each leg. Each of the legs in the graphite heater had an overall thickness in the horizontal dimension of approximately $\frac{1}{4}$″. At its free end, the graphite heater terminated in an enlarged head portion having a length of approximately 1$\frac{1}{16}$″ and an overall thickness of approximately 0.260″ at points midway between their lengths. At the bridge end, each of the legs was integrally formed with enlarged head portions having a height of approximately 1$\frac{5}{8}$″ and an overall thickness of 0.500″. Each of the legs, at the point of attachment to the enlarged head portions, had overall thicknesses of 0.230″ and, at points of attachment to the head portions of the free end, had overall thicknesses of approximately 0.215″. At the bridge portion, the enlarged head portion was formed with an aperture having a diameter of approximately $\frac{1}{2}$″ and was located at the point midway between each of the legs.

The bridge was loaded on one side with silicon wafers having an overall diameter of approximately 1$\frac{1}{4}$″, with an overall thickness of approximately .010″, by laying the bridge in a relatively horizontal position. The bridge was then lifted to a vertical position by the enlarged bight portion allowing the wafers to slide down into the slots or notches of the pins. The bridge was tapped lightly so that the wafers will become more securely positioned within the notches of the pegs. The bridge was then turned over so that the wafers were on the underside of the bridge and the bridge was supported at approximately a 30° angle with the retaining element. The opposite side of the bridge was then loaded with twenty-eight wafers in the same manner as the first of the bridge was loaded. Accordingly, it can be seen that the bridge was provided with fourteen wafers on each leg for a total of twenty-eight wafers on each flat surface, thereby providing a total of fifty-six wafers on the vertically suspended bridge.

The loaded heating element was then clamped into the electrode of an epitaxial silicon furnace which was provided with means for water cooling the heater at the point of attachment to the electrode. The loaded heating element was then enclosed within a bell jar which was fastened to the base plate of the epitaxial silicon furnace. The interior chamber or reaction chamber was then purged with nitrogen for approximately 5 minutes. Thereafter, the furnace was then purged for approximately 5 minutes with purified hydrogen. Power was thereafter applied to the electrodes and the bridge was heated to a temperature of 1175° C. as measured by an optical pyrometer. As soon as the temperature was stabilized at 1175° C., gaseous trichlorosilane was fed into the bell jar for approximately 30 minutes. The hydrogen inlet gas was maintained at the same purging rate during the total reaction time, that is during the time of trichlorosilane feed. At the end of this thirty-minute period during the epitaxial deposition of silicon on the wafers, the trichlorosilane feed was stopped and the hydrogen feed was continued for approximately five additional minutes. The power to the electrodes was then removed permitting the temperature of the furnace to decrease. During the reduction of temperature of the heating element, the furnace was purged with hydrogen for approximately 10 additional minutes. The hydrogen was then eliminated and nitrogen feed for additional purging was admitted to the bell jar for five additional minutes. The furnace was then disassembled and the epitaxial silicon wafers were removed from the heating element.

The following table, Table I, illustrates the thicknesses of the epitaxial silicon layers on each of the wafers as a function of the position from the ends of the bridge. Table I also shows the center thickness and the wedging ratio of the epitaxial layers of each wafer on the exhaust side and the center thickness and wedging ratio of each wafer located on the jet side. For the purposes of this example, the exhaust side of the bridge is defined as that side of the bridge which was located on the same side of the furnace as the exhaust vent. The jet side of the bridge is defined as that side of the bridge which was located nearest the intake port for the feed gases in the furnace. In Table I, the wafers numbered 1 and 15 on the jet side and 29 and 43 on the exhaust side are the wafers nearest the clamped edges of the bridge. Accordingly, the wafers numbered 14, 28, 42, 56 are the wafers nearest the bight portion of the bridge.

TABLE I

| Wafer No. | Jet Side Center Thickness | Wedging Ratio, Max./Min. | Wafer No. | Exhaust Side Center Thickness | Wedging Ratio, Max./Min. |
|---|---|---|---|---|---|
| Leg 1: | | | Leg 2: | | |
| 1 | 2.11 | 1.11 | 29 | 1.61 | 1.17 |
| 2 | 1.98 | 1.09 | 30 | 1.71 | 1.13 |
| 3 | 1.90 | 1.09 | 31 | 1.47 | 1.06 |
| 4 | 1.86 | 1.02 | 32 | 1.43 | 1.01 |
| 5 | 1.86 | 1.05 | 33 | 1.45 | 1.01 |
| 6 | 1.79 | 1.07 | 34 | 1.49 | 1.02 |
| 7 | 1.83 | 1.10 | 35 | 1.51 | 1.04 |
| 8 | 1.83 | 1.07 | 36 | 1.58 | 1.04 |
| 9 | 1.84 | 1.06 | 37 | 1.65 | 1.02 |
| 10 | 1.87 | 1.09 | 38 | 1.71 | 1.02 |
| 11 | 1.83 | 1.05 | 39 | 1.76 | 1.00 |
| 12 | 1.82 | 1.05 | 40 | 1.83 | 1.03 |
| 13 | 1.80 | 1.04 | 41 | 1.83 | 1.02 |
| 14 | 1.73 | 1.12 | 42 | 1.81 | 1.04 |
| Leg 2: | | | Leg 1: | | |
| 15 | 2.09 | 1.05 | 43 | 1.73 | 1.10 |
| 16 | 1.91 | 1.04 | 44 | 1.57 | 1.04 |
| 17 | 1.85 | 1.06 | 45 | 1.53 | 1.03 |
| 18 | 1.81 | 1.06 | 46 | 1.52 | 1.02 |
| 19 | 1.74 | 1.07 | 47 | 1.51 | 1.01 |
| 20 | 1.77 | 1.04 | 48 | 1.52 | 1.01 |
| 21 | 1.77 | 1.04 | 49 | 1.57 | 1.01 |
| 22 | 1.77 | 1.03 | 50 | 1.59 | 1.04 |
| 23 | 1.75 | 1.03 | 51 | 1.69 | 1.04 |
| 24 | 1.74 | 1.02 | 52 | 1.69 | 1.02 |
| 25 | 1.74 | 1.02 | 53 | 1.75 | 1.01 |
| 26 | 1.71 | 1.02 | 54 | 1.75 | 1.02 |
| 27 | 1.69 | 1.01 | 55 | 1.76 | 1.00 |
| 28 | 1.60 | 1.05 | 56 | 1.76 | 1.03 |

The wedging ratio is defined as the maximum/minimum thickness of the epitaxial layer. In actuality, four measurements at various points on the periphery of the wafer were made for thickness and a measurement was made at the center of the wafer for thickness. However, only the eccentric thickness of the wafer is reported inasmuch as the center thickness and the wedging ratio are the most important elements to be known for efficiency of operation of the bridge. It can be seen that the average wedging ratio was 1.046 and the number of wafers which had a wedging ratio of less than 1.10 was 93%. These results are far superior to results obtained when the bridges are located in a horizontal position in the epitaxial silicon furnaces.

*Example 2*

The following example describes the employment of the bridge B′ of the present invention which is capable of retaining two rows of wafers on each side of each leg of the bridge. The bridge employed in this example had an overall height of 24″ and a width of approximately 6″. Each leg had, in effect, a width of approximately $2\frac{15}{16}$″ separated by a slot of $\frac{1}{8}$″ between each leg. Each of the legs of the graphite heater had an overall thickness in the horizontal dimension of approximately $\frac{1}{4}$″. At its free end, the graphite heater terminated in an enlarged head portion having a height of approximately $1\frac{1}{16}$″ and an overall thickness of 0.260″. At the bridge end, each of the legs was integrally formed with enlarged head portions having a vertical height of approximately $1\frac{5}{8}$″ and an overall thickness of 0.500″. Moreover, each of the legs at the point of attachment to the enlarged head portions had overall thicknesses of 0.230″. At points of attachment to the head portions at the free ends, the legs had overall thicknesses of approximately 0.215″. At the bridge portion, the enlarged head was formed with an aperture having a diameter of approximately $\frac{1}{2}$″ and was located at a point midway between each of the legs.

The bridge was loaded with 56 wafers on the jet side, that is the side which is located near the feed gas jets in the epitaxial silicon furnace, by laying the bridge in a substantially horizontal position and placing each of the wafers in the wafer positions. Each leg was sufficiently wide so that it was provided with an outer row of 14 wafers and an inner row of 14 wafers thereby providing a total of 28 wafers on each leg or a total of 56 wafers on the jet side. Thereafter, the bridge was turned over and 56 additional wafers were inserted in the wafer positions on the exhaust side of the bridge, that is the side which is closest to the exhaust vent in the epitaxial silicon furnace. The bridge was tapped lightly so that each of the wafers became more securely positioned in the slots of each of the pins.

The bridge was then clamped to the electrodes of an epitaxial silicon furnace and a bell jar was fastened to the base plate of the epitaxial silicon furnace. Thereafter, the reaction chamber formed by the bell jar was purged with nitrogen for 5 minutes. The furnace was then purged for five minutes with purified hydrogen. The power was then applied to the electrodes so that the bridge was heated to a temperature of approximately 1175° C. When the temperature reached an equilibrium position, trichlorosilane was fed into the reaction chamber while the hydrogen was still maintained at the same purging rate. The feed gases were held at these rates for approximately 30 minutes where silicon was created and deposited on the surface of the silicon wafers. At the end of this time, the trichlorosilane gas feed was shut off and the temperature was maintained for approximately 5 minutes. The power was then discontinued and the furnace was allowed to cool in the presence of a hydrogen feed for approximately ten minutes. The hydrogen was then removed and nitrogen was admitted to the interior reaction chamber for approximately 5 minutes. Thereafter, the furnace was disassembled and the various wafers removed from the heating element.

Table II set forth below records the center thickness of the epitaxial silicon layer on each of the wafers, and the wedging ratio on each of the wafers. The wedging ratio is defined as the ratio of the maximum thickness of any portion of the epitaxial layer to the minimum thickness of any portion of an epitaxial layer on one wafer.

TABLE II

JET SIDE—LEG NO. 1

| Wafer No. Outer Row | Center Thickness | Wedging Ratio | Wafer No. Inner Row | Center Thickness | Wedging Ratio |
|---|---|---|---|---|---|
| 1 | 1.57 | 1.06 | 15 | 1.76 | 1.06 |
| 2 | 1.35 | 1.05 | 16 | 1.47 | 1.08 |
| 3 | 1.27 | 1.04 | 17 | 1.32 | 1.06 |
| 4 | 1.22 | 1.09 | 18 | 1.29 | 1.02 |
| 5 | 1.22 | 1.06 | 19 | 1.31 | 1.02 |
| 6 | 1.21 | 1.09 | 20 | 1.35 | 1.02 |
| 7 | 1.25 | 1.12 | 21 | 1.42 | 1.03 |
| 8 | 1.29 | 1.11 | 22 | 1.46 | 1.05 |
| 9 | 1.34 | 1.10 | 23 | 1.55 | 1.04 |
| 10 | 1.37 | 1.12 | 24 | 1.55 | 1.04 |
| 11 | 1.39 | 1.09 | 25 | 1.57 | 1.02 |
| 12 | 1.39 | 1.11 | 26 | 1.55 | 1.03 |
| 13 | 1.43 | 1.06 | 27 | 1.56 | 1.03 |
| 14 | 1.37 | 1.26 | 28 | 1.51 | 1.06 |

JET SIDE—LEG NO. 2

| | | | | | |
|---|---|---|---|---|---|
| 43 | 1.60 | 1.16 | 29 | 1.73 | 1.10 |
| 44 | 1.35 | 1.13 | 30 | 1.53 | 1.09 |
| 45 | 1.21 | 1.08 | 31 | 1.36 | 1.05 |
| 46 | 1.17 | 1.09 | 32 | 1.29 | 1.02 |
| 47 | 1.18 | 1.12 | 33 | 1.27 | 1.02 |
| 48 | 1.18 | 1.12 | 34 | 1.34 | 1.04 |
| 49 | 1.22 | 1.15 | 35 | 1.37 | 1.02 |
| 50 | 1.28 | 1.10 | 36 | 1.46 | 1.03 |
| 51 | 1.36 | 1.15 | 37 | 1.53 | 1.02 |
| 52 | 1.39 | 1.13 | 38 | 1.56 | 1.04 |
| 53 | 1.47 | 1.10 | 39 | 1.61 | 1.01 |
| 54 | 1.51 | 1.06 | 40 | 1.63 | 1.01 |
| 55 | 1.54 | 1.07 | 41 | 1.63 | 1.02 |
| 56 | 1.43 | 1.18 | 42 | 1.57 | 1.05 |

EXHAUST SIDE—LEG NO. 1

| | | | | | |
|---|---|---|---|---|---|
| 99 | 1.80 | 1.04 | 85 | 1.80 | 1.07 |
| 100 | 1.62 | 1.04 | 86 | 1.54 | 1.05 |
| 101 | 1.53 | 1.06 | 87 | 1.44 | 1.02 |
| 102 | 1.49 | 1.05 | 88 | 1.41 | 1.01 |
| 103 | 1.47 | 1.04 | 89 | 1.39 | 1.03 |
| 104 | 1.47 | 1.01 | 90 | 1.39 | 1.01 |
| 105 | 1.45 | 1.01 | 91 | 1.39 | 1.02 |
| 106 | 1.46 | 1.02 | 92 | 1.41 | 1.01 |
| 107 | 1.44 | 1.02 | 93 | 1.43 | 1.01 |
| 108 | 1.43 | 1.02 | 94 | 1.43 | 1.01 |
| 109 | 1.42 | 1.04 | 95 | 1.46 | 1.02 |
| 110 | 1.43 | 1.03 | 96 | 1.48 | 1.00 |
| 111 | 1.27 | 1.10 | 97 | 1.46 | 1.01 |
| 112 | 1.32 | 1.13 | 98 | 1.43 | 1.04 |

EXHAUST SIDE—LEG NO. 2

| | | | | | |
|---|---|---|---|---|---|
| 57 | 1.79 | 1.11 | 71 | 1.82 | 1.06 |
| 58 | 1.62 | 1.06 | 72 | 1.52 | 1.05 |
| 59 | 1.51 | 1.05 | 73 | 1.42 | 1.03 |
| 60 | 1.44 | 1.02 | 74 | 1.36 | 1.02 |
| 61 | 1.43 | 1.04 | 75 | 1.38 | 1.02 |
| 62 | 1.41 | 1.02 | 76 | 1.36 | 1.02 |
| 63 | 1.38 | 1.03 | 77 | 1.37 | 1.01 |
| 64 | 1.36 | 1.03 | 78 | 1.36 | 1.02 |
| 65 | 1.34 | 1.04 | 79 | 1.37 | 1.03 |
| 66 | 1.34 | 1.03 | 80 | 1.38 | 1.03 |
| 67 | 1.32 | 1.02 | 81 | 1.39 | 1.04 |
| 68 | 1.30 | 1.05 | 82 | 1.40 | 1.05 |
| 69 | 1.29 | 1.05 | 83 | 1.38 | 1.05 |
| 70 | 1.18 | 1.26 | 84 | 1.35 | 1.07 |

In Table II, wafers numbers 1, 28, 29 and 56 are the wafers which are disposed on the jet side of the bridge nearest the end clamped at the electrodes. Similarly, wafers 14, 15, 42 and 43 are the wafers which are located on the jet side of the bridge furthermost from the clamped ends of the bridge. Wafers number 1 and 56 are the bottommost wafers in the outer rows on each of the legs and wafers 28 and 29 are the bottom wafers on each of the inner rows on each of the legs. Similarly, wafers number 57, 84, 85 and 112 are the wafers on the exhaust side of the bridge which are located nearest to the clamped ends of the bridge. Wafers 70, 71, 98 and 99 are the wafers which are positioned furthermost from the clamped ends of the bridge on the exhaust side. Wafers 57 and 112 are the wafers in the lowest position of the outermost rows on each leg and layers 84 and 85 are the bottom wafers on the innermost rows of each of the legs on the exhaust side.

It can be seen that the average welding ratio on the exhaust side was 1.039 and the average wedging ratio on the jet side was 1.073. Therefore, the average wedging ratio for all of the wafers in this particular example was 1.056. The total yield of wafers having a wedging ratio of less than 1.10 was 85.7%. The total yield of wafers from the jet side having an average wedging ratio of less than 1.10 was 76.8%. The number of wafers having a wedging ratio of less than 1.10 from the exhaust side was 94.6%. It is believed that a yield of approximately 85.7% of wafers in each run having a wedging ratio of less than 1.10 is excellent in view of the results achieved by the horizontal bridges of the prior art. Moreover, it is believed that these results are far superior to the results achieved in the device shown in Patent No. 3,131,098.

It should be understood that changes and modifications in the form, construction, arrangement and combination of parts presently described and pointed out may be made and substituted for those herein shown without departing from the nature and principle of my invention.

Having thus described our invention, what we desire to claim and secure by Letters Patent is:

1. An apparatus for the production of semiconductor materials where an epitaxial silicon layer is deposited on the surface of a silicon wafer, said apparatus comprising a vertically disposed graphite heating element having at least one leg, means for heating said element to a desired reaction temperature, and means for retaining the receiving wafer on the opposite surfaces of said leg.

2. A heating element comprising at least one leg formed of a resistance material and which is capable of being heated by passage of electrical current therethrough, said leg having a plurality of wafer positions, and a plurality of notched pegs operatively associated with said wafer positions for retaining wafers on said leg when the heating element is moved to a vertical position.

3. A heating element comprising at least one leg formed of a resistance material and which is capable of being heated by passage of electrical current therethrough, said leg having a plurality of wafer positions on each of its flat surfaces sized to accommodate wafers, and a plurality of notched pegs operatively associated with said wafer positions for retaining wafers on each flat surface of said leg when the heating element is moved to a vertical position.

4. A heating element comprising at least one leg formed of a resistance material and which is capable of being heated by passage of electrical current therethrough, said leg having a single row of a plurality of wafer positions on each of its flat surfaces sized to accommodate wafers, and a plurality of notched pegs operatively associated with said wafer positions for retaining wafers on each flat surface of said leg when the heating element is moved to a vertical position.

5. A heating element comprising at least one leg formed of a resistance material and which is capable of being heated by passage of electrical current therethrough, said leg having a plurality of rows of wafer positions and each of the rows being provided with a plurality of wafer positions on each of its flat surfaces sized to accommodate wafers, and a plurality of notched pegs operatively associated with said wafer positions for retaining wafers on each flat surface of said leg when the heating element is moved to a vertical position.

6. A heating element comprising at least one leg formed of a resistance material and which is capable of being heated by passage of electrical current therethrough, said leg having a plurality of wafer positions, and a plurality of notched pegs located below a horizontal centerline passing through each of said wafer positions for retaining wafers on said leg when the heating element is moved to a vertical position.

7. A heating element comprising at least one leg formed of a resistance material and which is capable of being heated by passage of electrical current therethrough, said leg having a pair of longitudinally extending rows of wafers and each of the rows being provided with a plurality of wafer positions, a pair of notched pegs located at the outer margins of a pair of wafer positions in said pair of rows and being positioned below the horizontal centerline passing through said pair of wafer positions, and a third notched peg located between each of said wafer positions and being positioned so that its upper peripheral margin is tangent to the horizontal centerline passing through said pair of wafer positions for retaining wafers on said leg when the heating element is moved to a vertical position.

8. A graphite heating element comprising at least one leg formed of a resistance material and which is capable of being heated by passage of electrical current therethrough, said leg having a plurality of silicon wafer positions, and a plurality of notched pegs located below a horizontal centerline passing through said silicon wafer position for retaining silicon wafers on said leg when the graphite heating element is moved to a vertical position.

9. A graphite heating element comprising at least one leg formed of a resistance material and which is capable of being heated by passage of electrical current therethrough, said leg having a pair of longitudinally extending rows of silicon wafers and each of the rows being provided with a plurality of silicon wafer positions, a pair of notched pegs located at the outer margins of a pair of silicon wafer positions in said pair of rows and being positioned below the horizontal centerline passing through said pair of silicon wafer positions, and a third notched peg located between each of said silicon wafer positions and being positioned so that its upper peripheral margin is tangent to the horizontal centerline passing through said pair of silicon wafer positions for retaining silicon wafers on said leg when the graphite heating element is moved to a vertical position.

10. A heating element comprising at least one leg formed of a resistance material and which is capable of being heated by passage of electrical current therethrough, said leg having a pair of opposed flat surfaces and a plurality of wafer positions on each of its flat surfaces sized to accommodate wafers, and retaining means operatively associated with said wafer positions for retaining wafers on each flat surface of said leg when the heating element is moved to a vertical position.

References Cited

UNITED STATES PATENTS

| | | | |
|---|---|---|---|
| 3,131,098 | 4/1964 | Krsek et al. | 148—175 |
| 3,220,380 | 11/1965 | Schaarschmidt | 118—48 |
| 3,271,208 | 9/1966 | Allegretti | 148—175 |

RICHARD M. WOOD, *Primary Examiner.*

C. L. ALBRITTON, *Assistant Examiner.*